April 30, 1935.   W. VAN B. ROBERTS   1,999,258
DIRECTIONAL AERIAL
Filed July 27, 1933
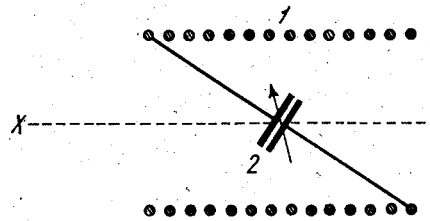
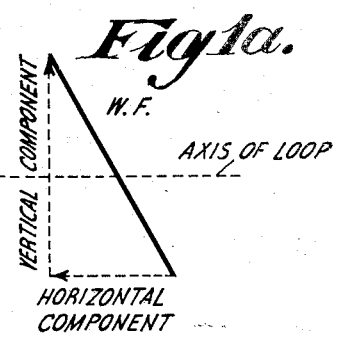
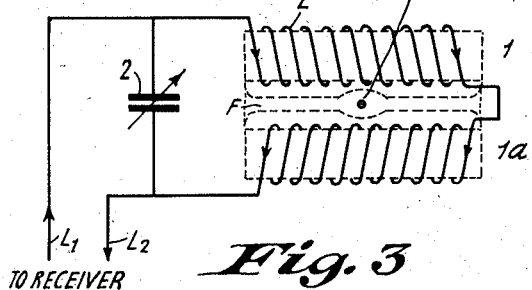
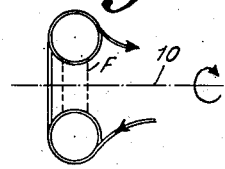
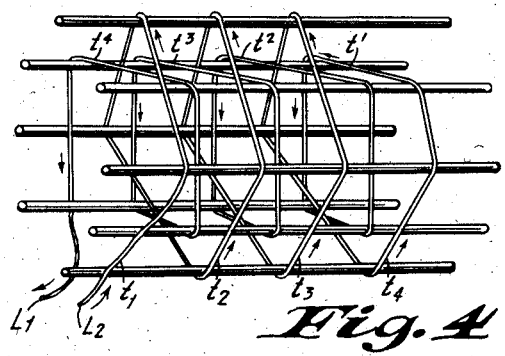
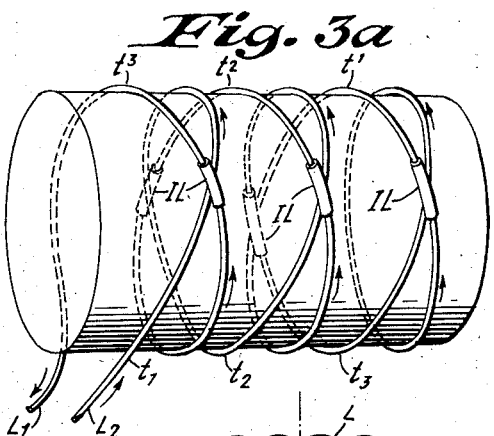
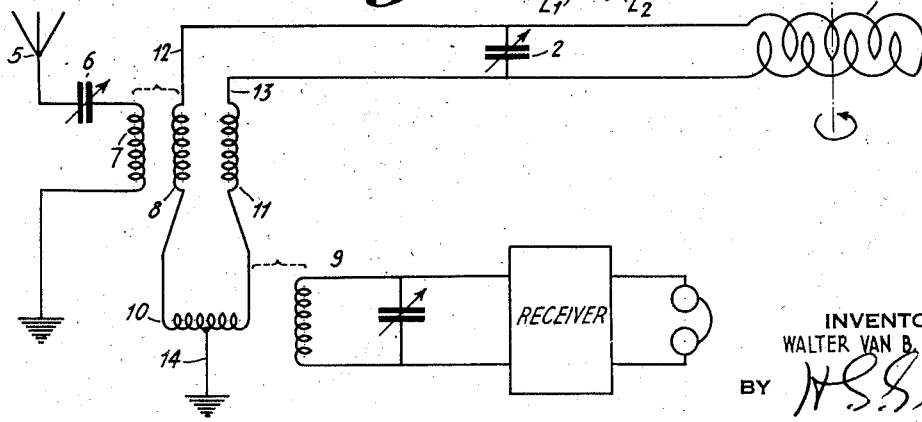
INVENTOR
WALTER VAN B. ROBERTS
BY
ATTORNEY Patented Apr. 30, 1935

1,999,258

UNITED STATES PATENT OFFICE 1,999,258

DIRECTIONAL AERIAL

Walter van B. Roberts, Princeton, N. J., assignor to Radio Corporation of America, a corporation of Delaware Application July 27, 1933, Serial No. 682,388

5 Claims. (Cl. 250—33)

This application relates to directional aerials and is a continuation in part of my application Serial No. 343,710 filed March 1, 1929.

In radio direction finders known heretofore of the type which use a rotatable loop aerial much difficulty has been encountered in obtaining a system in which at zero response in the receiver energized thereby, the loop aerial will be pointing directly towards the source of energy.

This inaccuracy in true pointing position is due in part to distorted wave front and in part to characteristics inherent in the apparatus used such as, for instance, 1—out of phase currents caused by the vertical aerial or electrostatic effect of the signal voltage on the tuned loop when the loop is unsymmetrical with respect to ground. This effect is present whether the wave front is distorted or not; 2—currents due to signal voltage across a loop of some axial length caused by a distorted wave front having horizontal component of the electric field. This voltage is in phase with the electrical field and the amount thereof changes as the loop is rotated, and the current set up thereby is either in phase or 180° out of phase with respect to the normal loop effect thereby distorting the normal loop characteristic curve. This effect is present whether the loop is symmetrical or not, and results in shifting the point of zero response so that the loop does not point directly towards the source of energy when signal response in the receiver is minimum. Aerial systems of the above type are subject to various other inherent defects caused either by unsymmetrical apparatus, or thereby when effected by unsymmetrical signal waves, however, those pointed out above will serve for purposes of illustration.

Heretofore various means have been provided to compensate the various errors above referred to by supplying to the aerial or receiver current in the proper phase to more or less compensate the undesired error causing currents introduced in each of the above mentioned ways. Such means known heretofore has necessitated the use of considerable additional apparatus.

The primary object of this invention is to provide a new and simple method of correcting the null points of a loop shifted from true pointing position by the effect of a component of the electric field along the axial length of the loop.

Another object of this invention is to provide a novel loop which includes a simple though novel feature that inherently prevents the undesired in phase voltages set up in the loop of some axial length from reaching the receiver to produce incorrect readings.

A better understanding of the invention and the operation thereof will be had from the following detailed description of the invention and therefrom when read in connection with the annexed drawing throughout which like references indicate like parts and in which:

Figure 1 illustrates how the horizontal component of the electric field acts on a tuned coil having appreciable length;

Fig. 1a shows a diagram of the horizontal component of the coil shown in Fig. 1;

Figure 2 shows a loop winding or inductance coil wound in a novel fashion to overcome the difficulties encountered with loops as illustrated in Figure 1;

Figure 2a shows an end view of the winding indicated in Fig. 2;

Figures 3 and 3a show modifications of the loop of Figure 2. The loops of Figures 2, 3 and 3a are bilateral in character; while, Figure 4 shows a receiving circuit connected with an aerial system which includes my novel loop for reducing error and a vertical aerial coupled to said loop aerial to obtain in the receiver a cardioid or unilateral characteristic curve.

Referring to the drawing and in particular to Figure 1 which shows a solenoidal coil or loop 1 tuned by means of a variable capacity 2. When the axis X of the coil coincides with the direction of propagation of the signals we would normally have no current produced in the coil. But, if the wave front is distorted as indicated by the heavy line WF of Figure 1 in addition to the expected purely vertical electric field which is perpendicular to the axis of the coil, there would exist, as shown, a vertical component and a horizontal electric component along the direction of signal propagation. Here, when the axis of the coil coincides with the direction of signals, a considerable current will be produced by this horizontal electric component. This is, of course, due to the fact that the incoming wave which tends to vary the potential of all objects it meets, hits one end of the coil first and thus causes a difference of potential between the ends of the coil. This difference in potential in turn sets up currents. As a result such a coil generally does not give a true indication of direction at its position of minimum signal response. Distorted wave fronts is the rule rather than the exception, and incorrect readings are often taken.

The object of the present invention is to provide a simple means for compensating and eliminating the error introduced in the above manner.

The difficulty may be obviated in accordance with the present invention by using a coil having two portions, 1 and 1a, which are in series, as shown, wound in the same direction, but advance axially in opposite directions with their axes parallel as shown in Figure 2. The above mentioned trouble does not exist in this case because when an incoming electric field is in the direction of the axis of the coil itself it strikes adjacent ends of the two portions at the same instant. Any currents produced or set up by the horizontal component in one portion are equal and opposite to similar currents set up in the other portion. The two currents buck out or cancel and never reach the receiver, which may be connected to the leads $L_1$ and $L_2$. The loop may be tuned by a condenser 2. The portions 1 and 1a may be supported on a frame F, as shown, for rotation about an axis 10.

A more compact form of loop aerial wound in accordance with my invention is illustrated in Figures 3 and 3a. In Figure 3, as in Figure 2, the loop includes a continuous conductor, all turns of which are wound in the same direction, the turns being in series. In Figure 3, however, the turns are all on a common axis or form. A portion of the turns $t_1$, $t_2$, etc., advance along this axis or form in one direction, while the other turns $t^1$, $t^2$, etc., advance along this form or axis in the other direction. The same remarks apply to the loop of 3a. The capacity between turns of the conductor is kept small by the manner of winding of the loop in Figure 3. This reduces the distributed capacity of the loop. The conductors may be separated at their crossing points by insulators IL, as shown, to further lower the distributed capacity. Where the turns are of the same diameter as in Figure 3a the distributed capacity may be kept small by the axial spacing between turns. The radial spacing may be increased by separating the turns at the points where they cross by insulating spacers IL, as shown.

My invention is preferably used in connection with other means known in the art for convenient operation of direction finders including auxiliary means for determining the sense as well as direction of the source of radiant energy.

In Figure 4, which shows the at present preferred embodiment of my invention, the loop antenna shown diagrammatically at L is wound, as illustrated in Figures 2, 3 and 3a, for the purpose of eliminating error normally caused by the current due to horizontal components of an electric field. The loop may be rotated about its axis X and tuned by condenser 2 to the desired signal. Sense of direction is obtained by means of a vertical aerial 5 tuned by a variable capacity 6, coupled through a series inductance 7 to an inductance 8 in series with the loop circuit 1, 2. By tuning the aerial 5 and adjusting the coupling between coils 7 and 8 current due to the vertical aerial effect in 1 can be introduced in the loop circuit in proper phase and amplitude to combine with the current therein to obtain a cardioid characteristic curve in the receivers. Energy from the aerial system is fed to the input elements of a receiver R by means of a tuned inductance 9 variably coupled to an inductance 10 in series with the loop 1. To prevent the vertical component of the electric field of the wave from setting up circulating currents in the tuned circuit the entire loop circuit including the coupling inductances is symmetrically balanced. This is attained by providing an inductance 11 electrically equivalent to the inductance 8 but in opposition thereto in series with the leads 12 and 13 connecting the inductances 10 and 8 in series with the loop 1. To further insure the complete balance of the apparatus the electrical midpoint of the inductance 10 is connected to ground through a connector 14.

For the sake of a more quantitative description of the various currents which may be produced in the tuned circuit L, 2 of Figure 4 before the compensating electric pickup adjustments have been made and the arrangement has been properly balanced with respect to ground, I will tabulate them as follows:

1. The normal loop effect

This is a voltage proportional to the rate of change of magnetic field linking the loop, and is also proportional to the sine of the angle between the axis of the loop and the direction of the signals. This voltage produces a current in the same phase if the loop is tuned.

2. Effect of horizontal component of electric field

This is proportional to the electric field and to the cosine of the angle between the loop axis and the signals and produces a current 90° out of phase with the voltage because the voltage is applied across the tuned circuit rather than in series in it. Thus, the current is in time phase with the normal loop effect current and as a result makes the zero position of the loop fail to coincide with the direction of signals.

3. Effect of vertical electric field

If the loop is not grounded at its electric center the vertical field will produce current in exactly the same fashion as discussed under item 2. However, since the vertical field will act the same way, whatever direction the signals are travelling the current produced will be constant and its phase will be the same as the phase of the currents in items 1 and 2.

4. The effect of the tuned vertical aerial on the loop

If the auxiliary open antenna is tuned to the signal the current in its coil will be in phase with the electric field and hence the magnetic field of its coupling coil 5 will be in the same phase as the magnetic field of the incoming signals. Thus, the current in the loop circuit produced by the coupling inductance in the open antenna 5 will be in phase with the normal loop current and by adjusting the coupling to such a value that the two currents are equal in amplitude a cardioid diagram is obtained.

If this cardioid diagram is to be a perfect one, that is, if the system is to have a true pointing position it is, of course, necessary that the two provisions for wiping out currents produced by the electric field, items 2 and 3 above, should have been made, namely, the grounding of the loop circuit at such a point that no circulating current is produced by the vertical electric field, and arranging the loop turns as disclosed to insure that any horizontal component of the electric field will produce no circulating current in the tuned circuit.

Having thus described my invention and the operation thereof, what I claim is:

1. A rotatable directive aerial system by means of which a non-symmetrical characteristic curve representative of the signal energy absorbed by the aerial when rotated may be obtained, which system is arranged to inherently compensate for the effect of the horizontal component of the electrical field of a distorted wave front on the axial length of said aerial so that the aerial system responds in effect only to the vertical magnetic field of the electrical wave comprising a loop aerial of appreciable axial length including, a plurality of turns of conducting material wound on a common axis, said turns being wound in the same direction, a portion of the turns advancing in a general direction perpendicular to the axis of rotation of said loop, the remaining turns advancing in the opposite direction.

2. A loop aerial comprising a cylindrical nonconducting supporting member and a closed absorption member thereon including, a plurality of turns of conducting material, all of said turns being wound in the same direction, an equal number of said turns advancing in opposite directions along said supporting member, said turns being in series.

3. A directive aerial system comprising, a loop aerial of appreciable axial length and composed of a plurality of turns of conducting material, all of which turns are wound in the same direction on a common axis, a part of said turns advancing along a line perpendicular to the axis of rotation of said aerial, the remaining turns advancing in the opposite direction, whereby the turns of said loop terminate at the same end of the loop, tuning means connected in parallel with said turns, and radio receiving means coupled to said tuning means.

4. A loop aerial comprising a cylindrical insulating support member, an inductance wound on said support member, said inductance comprising a plurality of conductor turns, said turns wound in the same direction on substantially the entire cylindrical surface of said support member, an equal number of turns advancing in an opposite direction on the surface of said cylindrical support member and crossing said first mentioned turns, and a plurality of insulators separating the oppositely wound conductor turns at their crossing points.

5. A loop aerial comprising a plurality of support rods, an inductance wound on said support rods, said inductance comprising a plurality of conductor turns, said turns being wound in the same direction on one-half the number of support rods, and an equal number of turns advancing in the opposite direction on the other half of said support rods and crossing said first mentioned turns at a position intermediate the turns located on said first mentioned support rods.

WALTER van B. ROBERTS.